W. H. DAMON.
AUTOMOBILE LOCK.
APPLICATION FILED FEB. 8, 1919.
1,328,619. Patented Jan. 20, 1920.
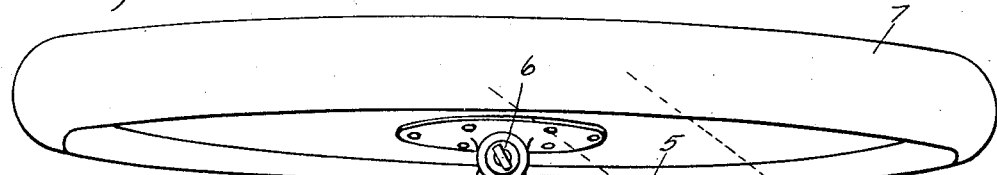
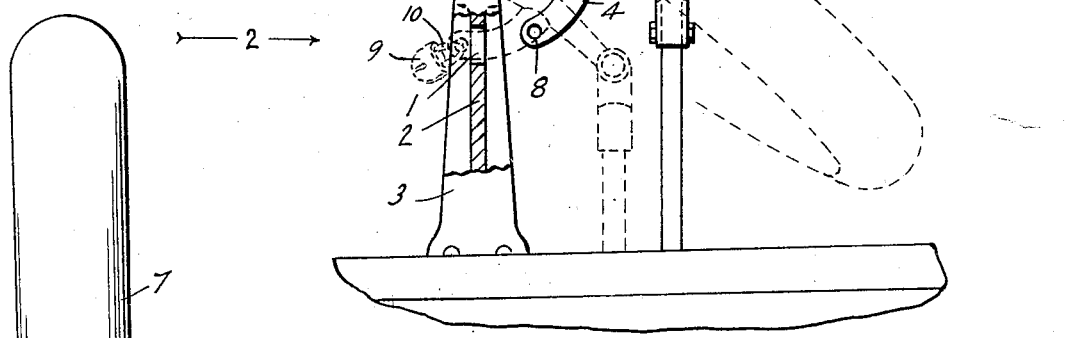
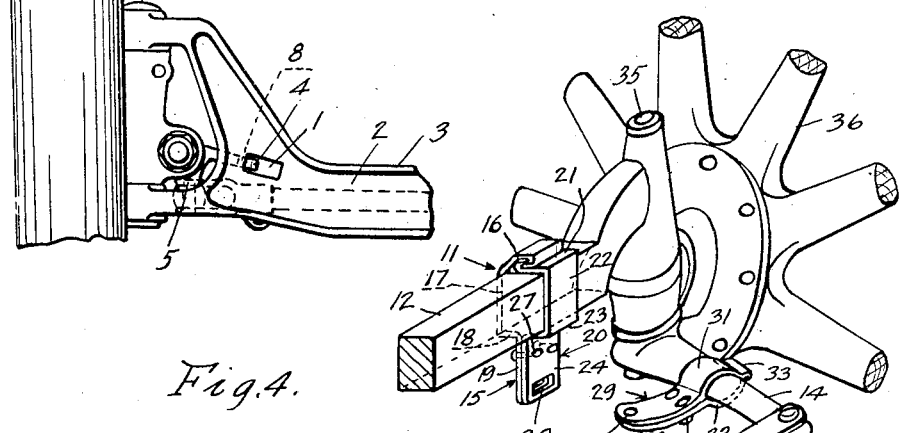
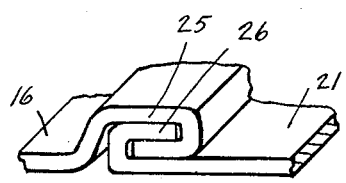
Inventor:
William H. Damon,
by Hazard & Miller
Atty's.

UNITED STATES PATENT OFFICE.

WILLIAM H. DAMON, OF LOS ANGELES, CALIFORNIA.

AUTOMOBILE-LOCK.

1,328,619.   Specification of Letters Patent.   Patented Jan. 20, 1920.

Application filed February 8, 1919. Serial No. 275,883.

*To all whom it may concern:*

Be it known that I, WILLIAM H. DAMON, a citizen of the United States, residing at Los Angeles, in the county of Los Angeles and State of California, have invented new and useful Improvements in Automobile-Locks, of which the following is a specification.

My invention relates to automobile locks and consists of the novel features herein shown, described and claimed.

Specifically my object is to make means for locking a steering gear so that the front wheels of an automobile may be cramped to their extreme position and locked so that the automobile cannot be steered by a thief.

Figure 1 is a fragmentary top plan view showing an automobile lock embodying the principles of my invention, the parts being in running position in full lines and in cramped locked position in dotted lines.

Fig. 2 is a fragmentary front elevation looking in the direction indicated by the arrow 2 in Fig. 1.

Fig. 3 is a fragmentary perspective showing a modified construction.

Fig. 4 is a fragmentary detail showing one of the joints used in the modified construction shown in Fig. 3.

Referring to the drawing in detail, an opening 1 is formed through a web 2 of a front axle 3. An arm 4 is formed integral with a steering knuckle arm 5, the said arm 4 being curved in plan concentric to a pivot pin 6 and the arm 4 being the proper length so that when the steering knuckle arm 5 swings inwardly to turn a wheel 7 to its extreme out-of-running line position as shown in dotted lines in Fig. 1 the point of the arm 4 will pass through the opening 1. A perforation 8 is formed through the point of the arm 4 so that the perforation will pass beyond the web 2 and a padlock 9 may be applied with a bolt 10 passing through the perforation 8 so as to lock the steering knuckle arm 5 to the axle so that the steering gear will not work and so that the automobile cannot be steered by a thief or unauthorized operator. When the padlock 9 is removed the parts are free to work as usual.

In the modification shown in Fig. 3 the lock consists of a member 11 clamped to an axle 12 and a member 13 clamped to a steering knuckle arm 14. The member 11 is formed of two pieces of heavy sheet metal stamped and pressed into shape. A piece 15 consists of a hook portion 16 fitting half way across the top of the axle 12; an intermediate portion 17 fitting down across one side of the axle 12; a second intermediate portion 18 fitting half way across the bottom of the axle 12; and a clamping member 19 extending straight down from the inner edge of the portion 18. A piece 20 consists of a hook portion 21 extending half way across the top of the axle 12; an intermediate portion 22 extending across the side of the axle 12; a second intermediate portion 23 extending half way across the bottom of the axle 12; and a clamping portion 24 extending straight down from the inner edge of the intermediate portion 23.

A hook 25 is formed upon the edge of the portion 16 and a hook 26 is formed upon the edge of the portion 21, said hooks being adapted to go together endwise and said hooks being like the hooks of a seam between two pieces of sheet metal. Bolts 27 connect the portions 19 and 24 securely together. A slot 28 is formed through the lower ends of the portions 19 and 24.

The member 13 is formed of pieces 29 and 30 of heavy sheet metal stamped and pressed into shape. A half bearing 31 is formed crosswise at one end of the piece 29 and a similar half bearing 32 is formed crosswise of the piece 30 to fit the steering knuckle arm 13. The bearing portions 31 and 32 are connected together by a hook construction 33 similar to the hooks 25 and 26. The pieces 29 and 30 are secured together by bolts 34 and form a curved arm extending from the steering knuckle arm 14 concentric to a pivot pin 35 so that when a wheel 36 is cramped to its extreme position to swing the steering knuckle arm 14 toward the axle 12 the arm will pass through the slot 28. A perforation 37 is formed through the arm so that when the arm is passed through the slot 28 a padlock may be applied as in Fig. 1.

Various changes may be made without departing from the spirit of my invention as claimed.

I claim:

1. An automobile lock comprising a member adapted to be clamped to an axle, said member being formed of two pieces of heavy sheet metal stamped and pressed into shape, one piece having a hook portion fitting half way across the top of the axle, a hook upon the hook portion, an intermediate portion fitting down across one side of the axle, a second intermediate portion fitting half way across the bottom of the axle, and a clamping member extending straight down from the inner edge of the second intermediate portion; the other piece having a hook portion extending half way across the top of the axle, a hook upon the hook portion, an intermediate portion extending across the side of the axle, a second intermediate portion extending half way across the bottom of the axle, and a clamping portion extending straight down from the inner edge of the second intermediate portion; the hooks being interlocked and the clamping portions being riveted together and there being a slot formed through the lower ends of the clamping portions; and a second member adapted to be clamped to a steering knuckle arm and formed of two pieces of heavy sheet metal stamped and pressed into shape, one piece having a half bearing formed crosswise at one end, and the other piece having a mating half bearing, said half bearings being adapted to fit the steering knuckle arm and there being interlocking hooks extending one way from the half bearings, and the pieces fitting together at the opposite sides of the half bearings from the hooks, and there being rivets securing the pieces together and there being a perforation through the outer ends of the pieces; so that the second member will pass through the slot in the first member and so that a lock may be applied through the perforation in the second member.

2. An automobile lock comprising a member adapted to be clamped to an axle, said member being formed of two pieces of heavy sheet metal stamped and pressed into shape; one piece having a hook portion fitting half way across the top of the axle, a hook upon the hook portions, an intermediate portion fitting down across one side of the axle, a second intermediate portion fitting half way across the bottom of the axle, and a clamping member extending straight down from the inner edge of the second intermediate portion; the other piece having a hook portion extending half way across the top of the axle, a hook upon the hook portion, an intermediate portion extending across the side of the axle, a second intermediate portion extending half way across the bottom of the axle, and a clamping portion extending straight down from the inner edge of the second intermediate portion; the hooks being interlocked and the clamping portions being riveted together and there being a slot formed through the lower ends of the clamping portions; and a second member adapted to be clamped to a steering knuckle arm, so that the second member will pass through the slot in the first member, and so that a lock may be applied through a perforation in the second member.

3. An automobile lock comprising a member adapted to be clamped to an axle and having a slot and a second member adapted to be clamped to a steering knuckle arm and formed of two pieces of heavy sheet metal stamped and pressed into shape, one piece having a half bearing formed crosswise at one end, and the other piece having a mating half bearing, said half bearings being adapted to fit the steering knuckle arm and there being interlocking hooks extending one way from the half bearings, and the pieces fitting together at the opposite sides of the half bearings from the hooks, and there being rivets securing the pieces together and there being a perforation through the outer ends of the pieces; so that the second member will pass through the slot in the first member and so that a lock may be applied through the perforation in the second member.

In testimony whereof I have signed my name to this specification.

WILLIAM H. DAMON.